United States Patent [19]

Yamawaki et al.

[11] Patent Number: 4,516,804
[45] Date of Patent: May 14, 1985

[54] VEHICLE BODY CEILING SEAL CONSTRUCTION

[75] Inventors: Takeshi Yamawaki, Okazaki; Tatuya Saitou; Sigemi Sugimori, both of Toyota, all of Japan

[73] Assignee: Toyota Jidosha Kabushiki Kaisha, Japan

[21] Appl. No.: 511,451

[22] Filed: Jul. 7, 1983

[30] Foreign Application Priority Data

Oct. 5, 1982 [JP] Japan .......................... 57-150968[U]

[51] Int. Cl.³ .............................................. B62D 25/06
[52] U.S. Cl. ...................................... 296/214; 296/76; 296/93; 296/210; 49/485
[58] Field of Search .................. 296/210, 93, 76, 214; 52/208; 49/485

[56] References Cited

U.S. PATENT DOCUMENTS 3,065,022 11/1962 Schutte ................................. 296/214
3,294,436 12/1966 Bull et al. ............................. 296/214
4,275,919 6/1981 Okamoto ............................. 296/214

Primary Examiner—Robert R. Song
Attorney, Agent, or Firm—Parkhurst & Oliff

[57] ABSTRACT

A vehicle body construction for a ceiling in the passenger compartment in a vehicle. The body construction comprises a ceiling trim device for concealing a gap defined between the inner end of a weather strip and the inner roof panel, and a clip inserted between the ceiling trim device and the inner roof panel, whereby the ceiling trim device is attached onto the inner roof panel by the clip.

13 Claims, 6 Drawing Figures

VEHICLE BODY CEILING SEAL CONSTRUCTION

BACKGROUND OF THE INVENTION

The present invention relates to a vehicle body construction associated with the ceiling of the vehicle, and more particularly to a vehicle body construction which conceals a space defined between the weather strip and the roof panel in a vehicle.

The ceiling facing the passenger compartment in a vehicle can be adapted so that it is fixed to the roof panel of the vehicle by using a device which attaches along the edge of the ceiling. Some prior art does exist for fixing the ceiling to the roof panel as evidenced in FIGS. 5 and 6.

The prior art in FIG. 5 shows the roof ceiling edge 11 fixed to the roof panel through the use of a ceiling trim device 4a. A weather strip 3a was placed upon the edge of the outer roof panel and held in position by the resilient characteristics of the material comprising the weather strip 3a. Inner extensions on both sides of the weather strip 3a hold the strip to the outer roof panel.

As apparent from FIG. 5, there is a defined space between the inner end 300a of the weather strip 3a and the curved flange 41a near the outer end of the ceiling trim device 4a. Therefore, when the weather strip 3a is placed on the edge of the outer roof panel, a space B1 is created. When viewing this connection mechanism from direction "A", the space B1 is recognizable, thus impairing the aesthetic view as well as creating an area for moisture and dirt to accumulate.

Another example of the prior art is disclosed in FIG. 6. Here the ceiling 1 is fixed to the roof panel by a screw S passing through the ceiling trim device 4b. The screw S fastens the ceiling trim device 4b to the roof panel B of the vehicle and after being fully engaged protrudes into the opening H which is within the roof panel. According to the prior art, a passenger can see the screw S and the inverted trough, which is necessary to accomodate screw S, which, unfortunately, also acts as a dirt accumulation area. Therefore, both forms of prior art indicated in FIGS. 5 and 6, impair the aesthetic view and create problems of moisture or dirt accumulation.

SUMMARY OF THE INVENTION

The present invention was made in view of the above background and to overcome the above-discussed drawbacks. It is accordingly an object of this invention to provide a vehicle body construction for concealing the space created between the weather strip and the roof panel in a vehicle.

To attain the above objects, a device according to the present invention comprises:

an outer roof panel;

an inner roof panel provided near the inner side of the outer roof panel;

a weather strip attached onto the end of the outer roof panel;

a ceiling in the passenger compartment of the vehicle located near the inner side of the inner roof panel; and a ceiling trim device for fixing the ceiling to the roof panels, wherein the improvement comprises that:

the ceiling trim device is provided with a curved flange for concealing the gap between the inner end of the weather strip and the inner roof panel, and a clip is inserted between the ceiling trim device and the inner roof panel which fixes the ceiling to the inner roof panel by attaching to the edge of the inner roof panel therein.

BRIEF DESCRIPTION OF THE DRAWINGS

The above objects, features and advantages of the present invention will become more apparent from reading the following description of the preferred embodiments taken in connected with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
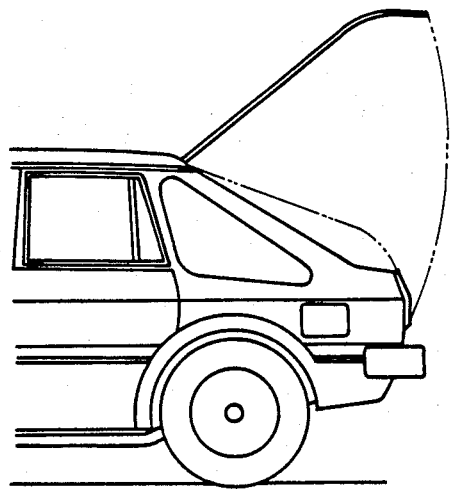
FIG. 1 is a side elevation of the rear of a vehicle body.

Referring first to FIG. 1, there is shown a side elevation of the rear of a vehicle body. In this hatchback type of vehicle, the rear window is installed in the vehicle body swingable upwardly for purposes of loading baggage into the trunk of the vehicle.

Figure 2:
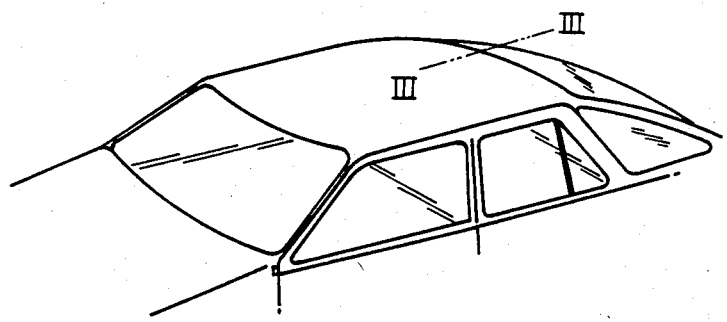
FIG. 2 is a perspective view of the vehicle body.

Referring next to FIG. 2, there is illustrated a perspective view of a vehicle body.

Figure 3:
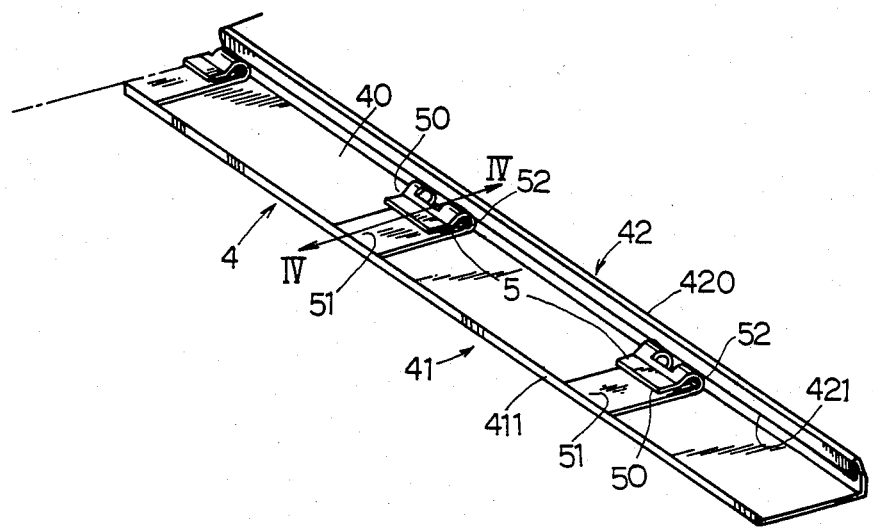
FIG. 3 is a perspective view of a ceiling trim device according to the present invention.
Figure 4:
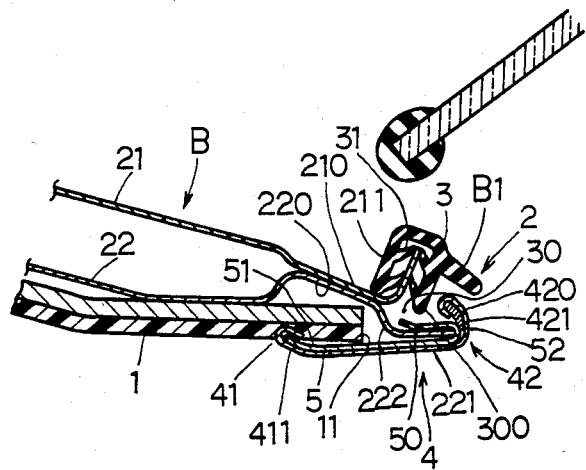
FIG. 4 is a cross-sectional view taken along line IV—IV in FIG. 3.
Figure 5:
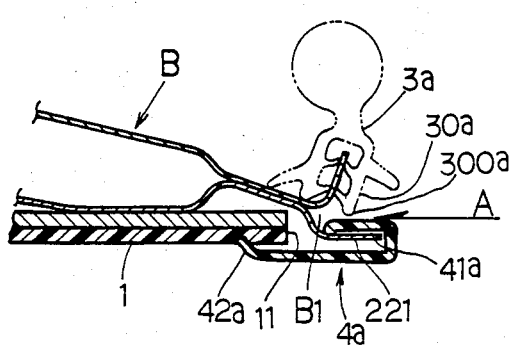
FIG. 5 is a cross-sectional view of prior art corresponding to the line IV—IV in FIG. 4.
Figure 6:
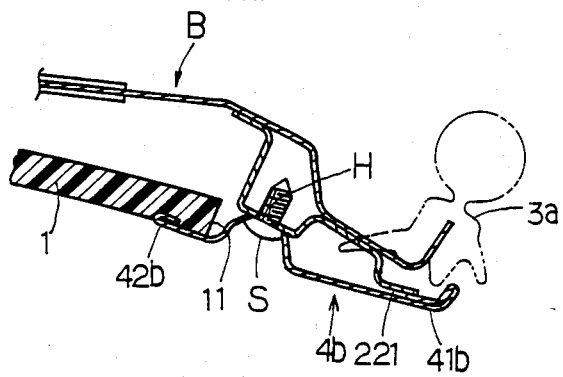
FIG. 6 is a cross-sectional view of more prior art corresponding to the line IV—IV in FIG. 4.

Next, FIG. 3 shows a perspective view of a ceiling trim device for holding the ceiling in the passenger compartment of the vehicle to the roof panel of the vehicle. FIG. 4 illustrates a cross-sectional view of an embodiment according to the present invention.

The roof panel of the vehicle comprises an outer roof panel 21 which faces to the outside of the vehicle, and an inner roof panel 22 which faces to the inside of the vehicle. The panels have been joined together by spot welding the area 210 of the outer roof panel 21 to area 220 of the inner roof panel 22 in order to form the reinforcement part 2 of the door. The edge of the outer roof panel 21 extends outwardly from the vehicle and forms a weather strip flange 211, which creates an obtuse angle between the outer roof panel 21 and the ceiling 1 in the vehicle. The weather strip 3, composed of a resilient rubber material, is inserted onto the weather strip flange 211. The weather strip 3 attaches to the weather strip flange by inner extensions 31 which grip both sides of the outer roof panel 21.

The inner roof panel 22, located underneath the outer roof panel 21, along with the weather strip 3, extends longitudinally along the rear of the vehicle. A stepped area 222 is provided between the joint area 220 and the edge of the entire assembly. The ceiling comprises an outer layer of corrugated cardboard and an inner layer of plastic, such as vinyl, which faces the passenger compartment. The ceiling trim device 4 is located along the edge of the inner layer of the ceiling and the edge of the inner roof panel 22. The trim device 4 extends longitudinally along the back of the vehicle and has a forward curved portion 41 and rearward curved portion 42. The ceiling trim device 4 comprises a steel sheet coated with vinyl chloride. The forward end 41 of the curved portion 411 of the ceiling trim 4, lifts the ceiling 1 upwards towards the roof panels 21 and 22. The rearward curved end 421 of the ceiling trim 4 is forwardly bent.

As shown in FIGS. 3 and 4 a plurality of clips 5 are installed on the back face 40 of the ceiling trim device 4. Installation of the clips 5 to the ceiling trim 4 can be accomplished by either welding the clips to the ceiling trim 4 or bending the ends 51 and 52 of the clips 5 such that the curve formed on the biasing end 51 of the clips 5 is similar to the curved inner flange 411 of the ceiling trim device and the curved portion 52 formed on the clasping end 50 of the clips 5 is similar to the curved outer flange 421, which permits the clips 5 to be slidably inserted into the slot defined by the curved ends 411 and 421. The clip 5 comprises a clasping end 50, a biasing end 51 and a curved portion 52 which extends from the clasping end 50.

By utilizing this construction, the assembly operation is described as follows: the weather strip 3 is first attached to the outer roof panel 21 by inserting the inner extension 31 thereof onto the weather strip flange 211. Next the clips 5 are fixed to the back face of the ceiling trim device 4. The clasp 50 of clip 5 is engaged onto the rear end of the inner roof panel 22. This engagement results in the ceiling trim 4 being fastened to the inner roof panel 22. The ceiling 1 is subsequently lifted by the end 41 of the ceiling trim device 4. Since the curved flange 420 extends into the angled portion of the weather strip 3, the problem of the space gap has been eliminated. Also, the clips 50 have eliminated the need for screws and the corresponding troughs to accomodate the screws, thereby eliminating the dust accumulation problem.

While the present invention has been described in its preferred embodiments, it is to be understood that the invention is not limited thereto but may be otherwise embodied within the scope of the following claims.

What is claimed is:

1. A vehicle body construction having an outer roof panel, an inner roof panel located on the inner side of said outer roof panel, a weather strip attached to the end of said outer roof panel, a ceiling in the passenger compartment of the vehicle located on the inner side of said inner roof panel and a ceiling trim device for fixing said ceiling to said roof panels, wherein the improvement comprises:

the ceiling trim device is provided with a curved outer flange for concealing a gap between an inner edge of said weather strip and said inner roof panel and a curved inner flange for resiliently holding said ceiling to said roof panels; and a plurality of clips are located between said ceiling trim device and said inner roof panel, each clip having a clasping end adjacent to, and inside of, said curved outer flange of the ceiling trim device and a biasing end located adjacent to, and inside of, said curved inner flange of the ceiling trim device, whereby said clasping end of each clip attaches to said inner roof panel and said biasing end of each clip, in conjunction with the curved inner flange of the ceiling trim device, upwardly resiliently holds said ceiling against said roof panels.

2. The device of claim 1, wherein said ceiling trim device comprises a steel sheet coated with vinyl chloride.

3. The device of claim 1, wherein the edge of said outer roof panel extends outward from the vehicle.

4. The device of claim 3, wherein said weather strip is attached onto the end of the outer roof panel.

5. The device of claim 3, wherein an obtuse angle is formed between the outer roof panel and the ceiling in the vehicle.

6. The device of claim 1, wherein said outer roof panel and said inner roof panel are joined together by spot welding.

7. The device of claim 6, wherein said inner roof panel has a stepped area located between the area joined with the outer roof panel and the edge of the inner roof panel.

8. The device of claim 1, wherein the ceiling comprises an inner layer of vinyl and an outer layer of corrugated cardboard.

9. The device of claim 1, wherein each of the clips are welded to the ceiling trim device.

10. The device of claim 9, wherein each of the clips are welded to the ceiling trim device between said clasping portion and said biasing portion of each clip.

11. The device of claim 1, wherein each of the clips are slidably inserted into the ceiling trim device, whereby a curved portion of said clip located between said clasping portion of the clip and said ceiling trim device slidably engages said curved outer flange of the ceiling trim device.

12. A vehicle body construction having an outer roof panel, an inner roof panel located on the inner side of said outer roof panel, a weather strip attached to the end of said outer roof panel, a ceiling in the passenger compartment of the vehicle located on the inner side of said inner roof panel and a ceiling trim device for fixing said ceiling to said roof panels, wherein the improvement comprises:

the ceiling trim device is provided with a curved outer flange for concealing a gap between an inner edge of said weather strip and said inner roof panel and a curved inner flange for resiliently holding said ceiling to said roof panels; and a plurality of clips are located between said ceiling trim device and said inner roof panel, each clip having a clasping end adjacent to, and inside of, said said curved outer flange of the ceiling trim device and a biasing end located adjacent to, and inside of, said curved inner flange of the ceiling trim device, whereby said clips are welded to said ceiling trim device between said clasping portion and said biasing portion of each clip, and said clasping end of each clip attaches to said inner roof panel and said biasing end of each clip, in conjunction with the curved inner flange of the ceiling trim device, upwardly resiliently holds said ceiling against said roof panels.

13. A vehicle body construction having an outer roof panel, an inner roof panel located on the inner side of said outer roof panel, a weather strip attached to the end of said outer roof panel, a ceiling in the passenger compartment of the vehicle located on the inner side of said inner roof panel and a ceiling trim device for fixing said ceiling to said roof panels, wherein the improvement comprises:

the ceiling trim device is provided with a curved outer flange for concealing a gap between an inner edge of said weather strip and said inner roof panels and a curved inner flange for resiliently holding said ceiling to said roof panels; and a plurality of clips are located between said ceiling trim device and said inner roof panel, each clip having a clasping end adjacent to and inside of said curved outer flange of the ceiling trim device, a curved portion located between said clasping end and said curved outer flange, and a biasing end located adjacent to, and inside of, said curved inner flange of the ceiling trim device, whereby each of the clips are slidably inserted into the ceiling trim device with said curved portion contacting said inner flange of the ceiling trim device and said biasing end of each clip contacting said curved inner flange, permitting each clip to slidably engage the ceiling trim device, whereby said clasping end attaches to said inner roof panel and said biasing end, in conjunction with the curved inner flange of the ceiling trim device upwardly resiliently holds said ceiling against said roof panels.

* * * * *